(12) United States Patent
Burr et al.

(10) Patent No.: US 7,831,695 B1
(45) Date of Patent: Nov. 9, 2010

(54) SYSTEM AND METHOD FOR IT SYSTEM MIGRATION MANAGEMENT

(75) Inventors: Jonathon A. Burr, Overland Park, KS (US); Travis Euler, Overland Park, KS (US); Brett Ren, Olathe, KS (US); Laurence G. Vanderheiden, Stilwell, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 353 days.

(21) Appl. No.: 12/032,901

(22) Filed: Feb. 18, 2008

(51) Int. Cl.
*H04L 29/06* (2006.01)
*G06F 17/00* (2006.01)
*G06F 11/34* (2006.01)

(52) U.S. Cl. .................. 709/220; 709/221; 705/26; 714/48

(58) Field of Classification Search .............. 709/220
See application file for complete search history.

(56) References Cited

U.S. PATENT DOCUMENTS

| 6,564,342 | B2* | 5/2003 | Landan | 714/48 |
| 2004/0143507 | A1* | 7/2004 | Chen et al. | 705/26 |
| 2007/0299741 | A1* | 12/2007 | Emerick et al. | 705/26 |

\* cited by examiner

*Primary Examiner*—Ashok B Patel
*Assistant Examiner*—Joseph Gazda

(57) ABSTRACT

An information technology (IT) system configuration scorecard tool is disclosed. The scorecard tool comprises a first database of current configurations and a second database of standard configurations, a processor, and an analysis engine that, when executed by the processor, determines a configuration score based on comparing a standard configuration with a current configuration. The configurations are characterized, in part, by a server brand, a server model, an operating system, a database, and a plurality of applications.

16 Claims, 7 Drawing Sheets

| Application Name | Date | Data Center | Midrange, Mainframe | Server Brand | Server Models | OS | DB Type/Ver | 3rd Party SW & Ver | Project | Ag. Std Score | Historical /Future |
|---|---|---|---|---|---|---|---|---|---|---|---|
| Application 1 | Mar-2006 | 100% | 100% | 20% | 50% | 50% | 100% | 50% | | 81% | Historical (Past 6 Months) |
| | May-2006 | 100% | 100% | 20% | 100% | 100% | 100% | 50% | D9310 | 81% | |
| | Jul-2006 | 100% | 100% | 20% | 100% | 100% | 100% | 75% | D9318 | 85% | |
| | Sep-2006 | 100% | 100% | 50% | 100% | 100% | 100% | 85% | E1024 | 91% | Future (Next 6 Months) |
| | Nov-2006 | 100% | 100% | 50% | 100% | 100% | 100% | 85% | | 91% | |
| | Jan-2007 | 100% | 100% | 100% | 100% | 100% | 100% | 85% | E1089 | 98% | |
| Application 2 | Mar-2006 | 100% | 100% | 20% | 20% | 20% | 100% | 50% | | 59% | Historical (Past 6 Months) |
| | May-2006 | 100% | 100% | 20% | 20% | 20% | 100% | 50% | | 59% | |
| | Jul-2006 | 100% | 100% | 20% | 20% | 20% | 100% | 75% | D9426 | 62% | |
| | Sep-2006 | 100% | 100% | 20% | 20% | 20% | 100% | 85% | D9884 | 64% | Future (Next 6 Months) |
| | Nov-2006 | 100% | 100% | 20% | 20% | 20% | 100% | 85% | E1024 | 64% | |
| | Jan-2007 | 100% | 100% | 20% | 20% | 20% | 100% | 85% | | 64% | |

|  | User Access Terminals (100) ||| Midrange/Mainframe Server Computers (4) ||| Storage Device (15) ||| Database (4) ||| 3rd Party SW Apps (25) ||| Aggr. Score |
|---|---|---|---|---|---|---|---|---|---|---|---|---|---|---|---|
|  | Reconfig (RCF) (25) | Retired (RT) (40) | New (35) | RCF (1) | RT (2) | New (1) | RCF (5) | RT (5) | New (5) | RCF (1) | RT (1) | New (2) | RCF (10) | RT (5) | New (10) |  |
| Installed Base 310 |  | 60% |  |  | 50% |  |  | 35% |  |  | 50% |  |  | 65% |  | 52% |
| In-Prog. Config. 330 | 35% |  | 75% | 55% | 60% | 75% | 45% | 50% | 65% | 70% | 50% | 50% | 80% |  | 70% | 67%; 57% |
| Planned Config 340 | 70% | 70% | 75% | 75% |  | 80% | 50% |  | 65% | 70% | 50% | 65% | 85% | 70% | 70% | 71%, 67%, 60%. |
| Target State 350 | 95% |  | 100% | 100% |  | 100% | 100% |  | 100% | 100% |  | 100% | 100% |  | 100% |  |

FIG. 4

SYSTEM AND METHOD FOR IT SYSTEM MIGRATION MANAGEMENT

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

As information technologies (IT) advance, an existing or installed IT system might migrate to a new system using one or more new technologies. The migration process may be a gradual one, and a smooth transition from the installed base to the new system with minimal interruption of service may be needed. To minimize the service interruption, the installed base may carry out its normal functions until the new system is ready to take over. A common example of the IT system migration is that an enterprise IT system migrates to a new system that uses a new version of operating system, database, and server computers. In one migration scenario, the IT system migration is a continuous process with a current configuration and a target configuration. When the current system configuration reaches the target configuration, the target configuration becomes a new current configuration, and a new target configuration then becomes the next goal for the new current configuration to reach.

In another IT system migration scenario, the IT system migration may not happen as often as in the other scenario. One of the main goals for IT system migration is to reach a target system state. There may be three sets of system parts or modules that are involved in the system migration: retired parts from the installed base to be decommissioned, reconfigure parts from the installed base to be put in the new system after some reconfigurations or modifications, and new parts to be added to the new system. Thus, the tasks of IT system migration may include decommissioning the retired parts in a specified order to minimize the service interruption, and reconfiguring, modifying, integrating and testing the reconfigure parts and the new parts.

SUMMARY

In an embodiment, an information technology (IT) system configuration scorecard tool is disclosed. The scorecard tool comprises a first database identifying a plurality of current configurations of the IT system, a second database identifying a plurality of standard configurations of the IT system, and a processor in communication with the first database and the second database. The scorecard tool also comprises an analysis engine that, when executed by the processor, is configured to determine a first configuration score based on comparing a first standard configuration of the IT system to a first current configuration of the IT system. The comparing the first standard configuration of the IT system to the first current configuration of the IT system comprises at least one of comparing a first standard server brand designated in the first standard configuration to the server brand associated with each of a plurality of servers of the first current configuration, comparing a first standard server model designated in the first standard configuration to the server model associated with each of the servers of the first current configuration, comparing a first standard operating system (OS) designated in the first standard configuration to the operating system associated with each of the servers of the first current configuration, comparing a first standard database designated in the first standard with each of a plurality of databases of the first current configuration, and comparing a plurality of standard applications with each of a plurality of applications of the first current configuration.

In another embodiment, a system for managing an information technology (IT) system migration is provided. The system comprises, a processor implementing a target system module, a planned configuration module, a data collection module, and a trending module. The target system module is configured to identify a target system. The planned configuration module is configured to identify a planned configuration. The data collection module is configured to collect a first progress status data for an installed base, a second progress status data for an in-progress configuration, a third progress status data for the planned configuration, and a fourth progress status data for the target system. The trending module is configured to produce a current progress score by aggregating the first progress status data and the second progress status data to produce a planned progress score by aggregating the third progress status data, and to produce a target progress score by aggregating the fourth progress status data. The action plan module is configured to produce an action plan based on the current progress score, the planned progress score, and the target progress score. The system also comprises a storage device and an IT system database stored on the storage device and configured to store data on the installed base, data on the in-progress configuration, data on the planned configurations, data on the target system, the first progress status data, the second progress status data, the third progress status data, and the fourth progress status data.

In a further embodiment, a method for managing information technology (IT) system migration is provided. The method comprises identifying a target system, generating a target progress score based on progress status data of the target system, identifying a planned configuration, and generating a planned progress score based on progress status data of the planned configuration. The method also comprises collecting progress status data of an installed base, collecting progress status data of an in-progress configuration, and producing a current progress score based on the progress status data of the installed base and the progress status data of the in-progress configuration. The method also comprises determining a first weight for the installed base progress score, a second weight for the in-progress progress score, a third weight for the planned progress score, and a fourth weigh for the target progress score. The method also comprises determining a progress slope by applying the first weight to the installed base progress score to get a first weighted progress score, applying the second weight to the in-progress progress score to obtain a second weighted progress score, applying the third weight to the planned progress score to obtain a third weighted progress score, and applying the fourth weight to the target progress score to obtain a fourth weighted progress score. The method also comprises displaying at least the current progress score.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 2 illustrates an embodiment of an exemplary migration scorecard.

FIG. 4 illustrates an embodiment of a process for managing an IT system migration.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The present disclosure provides an IT system migration tool that may treat the IT system migration as a continuous process that includes a current configuration and a standard configuration. As the current configuration progresses toward the standard configuration, the standard configuration may change in response to technology changes, system requirement changes or both. In this case, a new standard configuration is set for a new target date. The management of the IT system migration is a continuous process of measuring the progress of the current configuration against the standard configuration at that point of time.

The present disclosure also provides a migration management system for the IT system migration that divides the IT system migration process into four states or four configurations to facilitate the measurement of the overall migration process. The four configurations may include an installed base, an in-progress configuration, a planned configuration, and a target system. The installed base is the current system that is to be replaced by the new system, and may include parts that are to be retired and parts that are to be used in the new system after some reconfigurations and modifications. The in-progress configuration may represent the state of the IT system migration that is in progress. The in-progress configuration may represent the progress achieved so far in getting the reconfigure parts and new parts operational in the new system. The planned configuration may represent an intermediate state that has been planned and might be achieved by a planned date. The target system may represent the final state of the new system.

Figure 1:
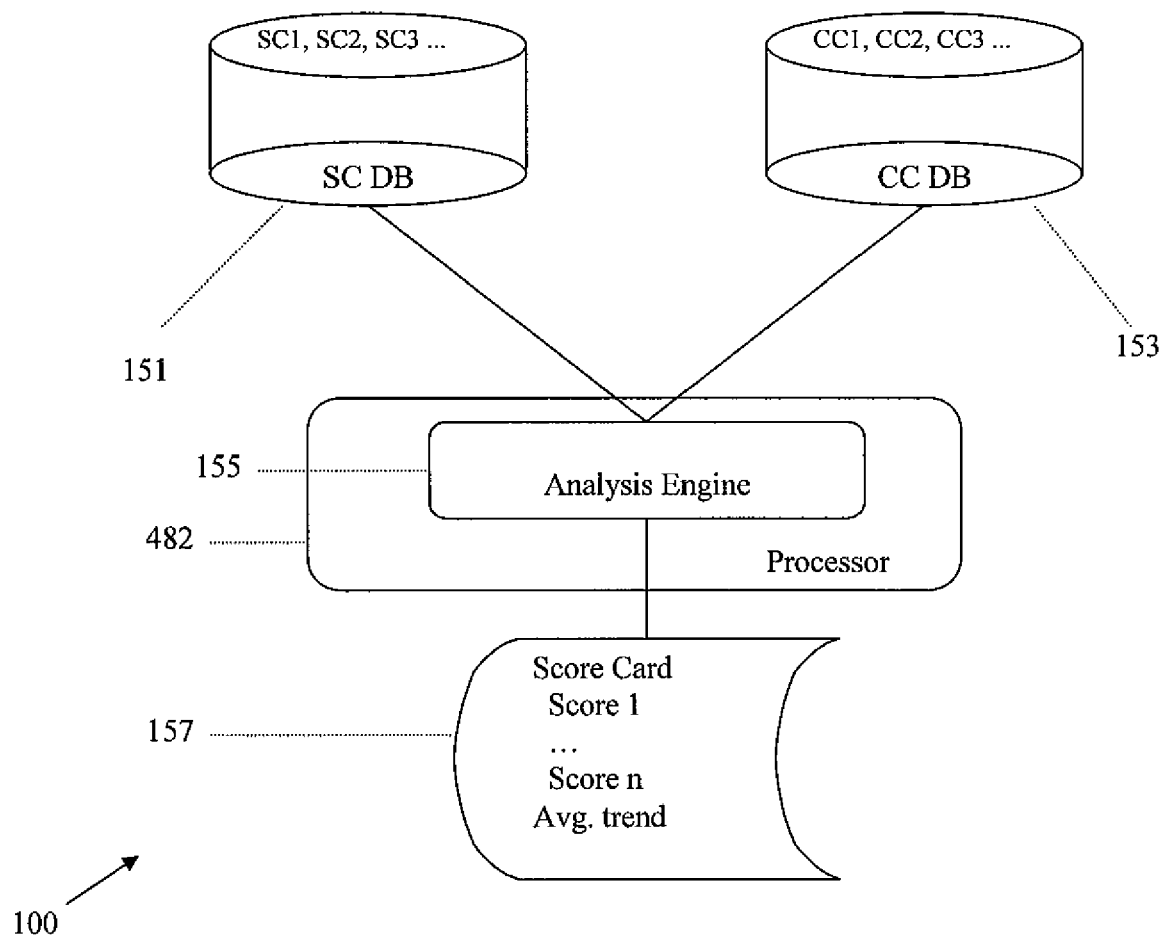
FIG. 1 illustrates an embodiment of an IT system migration scorecard tool.

FIG. 1 shows an IT system scorecard system 100, an embodiment of an IT system migration scorecard tool. The scorecard system 100 may include a standard configuration (SC) database 151, a current configuration (CC) database 153, an analysis engine 155 implemented on a processor 482, and a scorecard 157. The scorecard tool 100 shows a scenario where a current configuration of the IT system progresses toward a standard configuration.

The standard configuration database 151 may include entries for a number of standard configurations, such as SC1, SC2, and SC3. A standard configuration may represent a desired or target state for a specific point of time. As IT technologies advance, a different standard configuration may be defined for a later time. For example, a first standard configuration for a first point of time may include a SOLARIS 8.0 operating system (OS), and a second standard configuration for a second point of time may include the SOLARIS 10 operating system or a different operating system. Each standard configuration may include a number of parts, and each part may be a software module, a hardware module, or a combination of the two. Entries or records in the standard configuration database 151 may have a part ID field, a part description field, a constraint field to indicate one or more conditions that may apply to the part, and a current progress status field, among others. The standard configuration database 151 may be implemented using an object-oriented database, a relational database or other current or future database technologies.

The current configuration database 153 may include entries for a number of current configurations. A current configuration may represent the current state of the IT system at a specific point of time. As the current configuration migrates or evolves to reach the standard configuration for a particular point of time, a new standard configuration may be identified, and a new current configuration may be defined for the new standard configuration. Each current configuration, similar to the standard configuration, may include a number of parts, and each part may be a software module, a hardware module, or a combination of the two. Entries or records in the current configuration database 153 may have a part ID field, a part description field, a constraint field to indicate one or more conditions that may apply to the part, and a current progress status field, among others. The standard configuration database 151 and the current configuration database 153 may be implemented as a single database or multiple, distributed databases, depending on the design choice and the system configuration.

In one embodiment of the present disclosure, the standard configuration and the current configuration of an IT system may include one or more server brands, one or more server models, one or more operating systems, one or more databases, and one or more third party applications. A server is a computer with responsibilities that include but are not limited to providing various applications to networked computers. The functions and applications that a server computer may support may depend on a specific server brand and server model. Thus, in the process of IT system migration, the server model and server brand are important factors to be considered. The operating system is a software system that manages computing resources and enables the server computer to perform its designed functions. The database is one of the third party applications that may run on the server computer and store large amounts of data of various types. Other third party applications may also run on the server computer or other computers and form part of the IT system.

Figure 7:
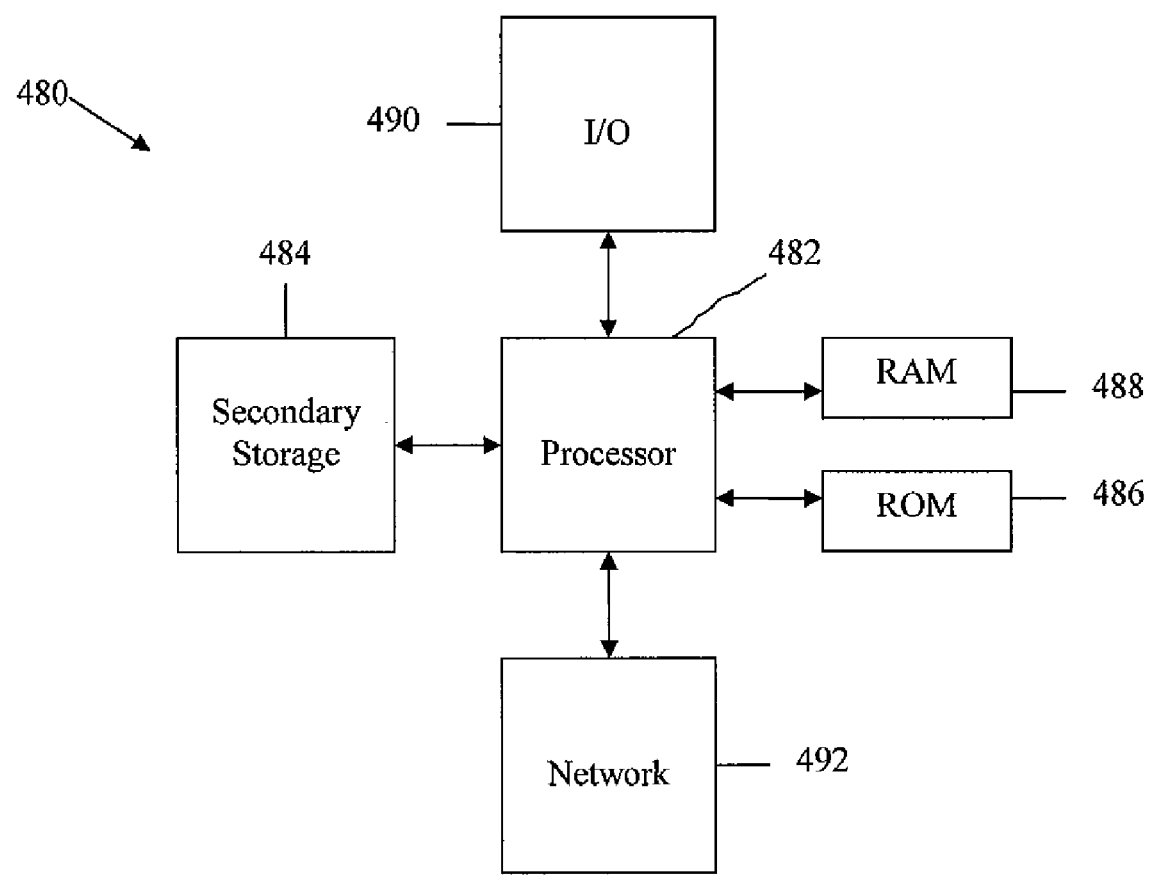
FIG. 7 illustrates an embodiment of an exemplary general-purpose computer system suitable for implementing the several embodiments of the disclosure.

The analysis engine 155, implemented within the processor 482, may aggregate the progress status data of parts in a current configuration and determine a summary progress score. The analysis engine 155 may also aggregate the progress scores of the current configuration to determine whether the current configuration is progressing toward the standard configuration as planned or is falling behind the plan. The analysis engine 155 may also assign a weight to a progress score according to the perceived importance, priority, or other criteria that may be used to assign the weight to the current or standard configuration itself. The scorecard 157 may present detailed scores, a summary progress score, or a combination of the two for the current configuration. An exemplary scorecard is illustrated in FIG. 2. The analysis engine may be implemented on the processor 482 included in a general purpose computer which is depicted in FIG. 7 and described hereinafter.

The analysis engine 155 may also trend the progress scores from multiple current configurations for different points of time to obtain a historical view of the system migration process. The historical view of the system migration process may facilitate the system migration management by showing whether a part of the current configuration has a history of high or low progress score on the scorecard. For example, the complexity of migrating a database from a current configuration to a standard configuration may be high, and the past scorecards may indicate a history of low progress scores. This may provide an indication that additional time should be allocated to this part or that attention be directed to the factors that cause the low progress scores in the past.

FIG. 2 illustrates an example IT system scorecard 200. The IT system scorecard 200 shows progress scores for an IT system that include two applications, application 1 and application 2. Each of the two applications may have a data center, one or more midrange or mainframe computers, one or more server models, an operating system, one or more databases with version and type, one or more $3^{rd}$ party software systems, and IDs of one or more internal projects that may cause the current configuration of the IT system to evolve towards the standard configuration.

The scorecard 200 shows a 100% progress status for the data center column, the midrange/mainframe server computer column, and the database type/version column. The 100% progress status may indicate that the data center, the server computers, and the database type and versions are already in their respective standard configuration and there is no need for further efforts. The server brand column indicates that the progress status for migrating from the server brand A to the server brand B, and a 20% progress status for July-2006 indicates that 20% of migration from the brand A to the brand B has been completed by this date. For example, the system may comprise 100 servers, 80 servers provided by brand A and 20 servers provided by brand B.

The scorecard 200 also shows a 50% progress status for the server model column and the operating system column for March-2006. A 100% progress status indicates that the server models and the operating system have reached their respective standard configuration by May 2006. The project IDs identify the internal projects that are involved in migrating the IT system or part of the IT system from the current configuration to the standard configuration. The scorecard 200 may also indicate a historical progress status vs. planned target progress status. For example, for the server brand column of the application 1, a progress status 20% for July 2006 indicates that moving the current server brands to target server brands of the standard configuration was 20% complete at that date. The target is a 100% progress status by January 2007.

The scorecard 200 may color code the progress status. For example, black may be used to color code the progress statuses that are on target and on schedule, yellow may be used as a warning color to color code the progress status that are falling behind the plan, and red may be used to color code those progress statuses that are falling behind the plan and may require corrective actions.

Figure 3:
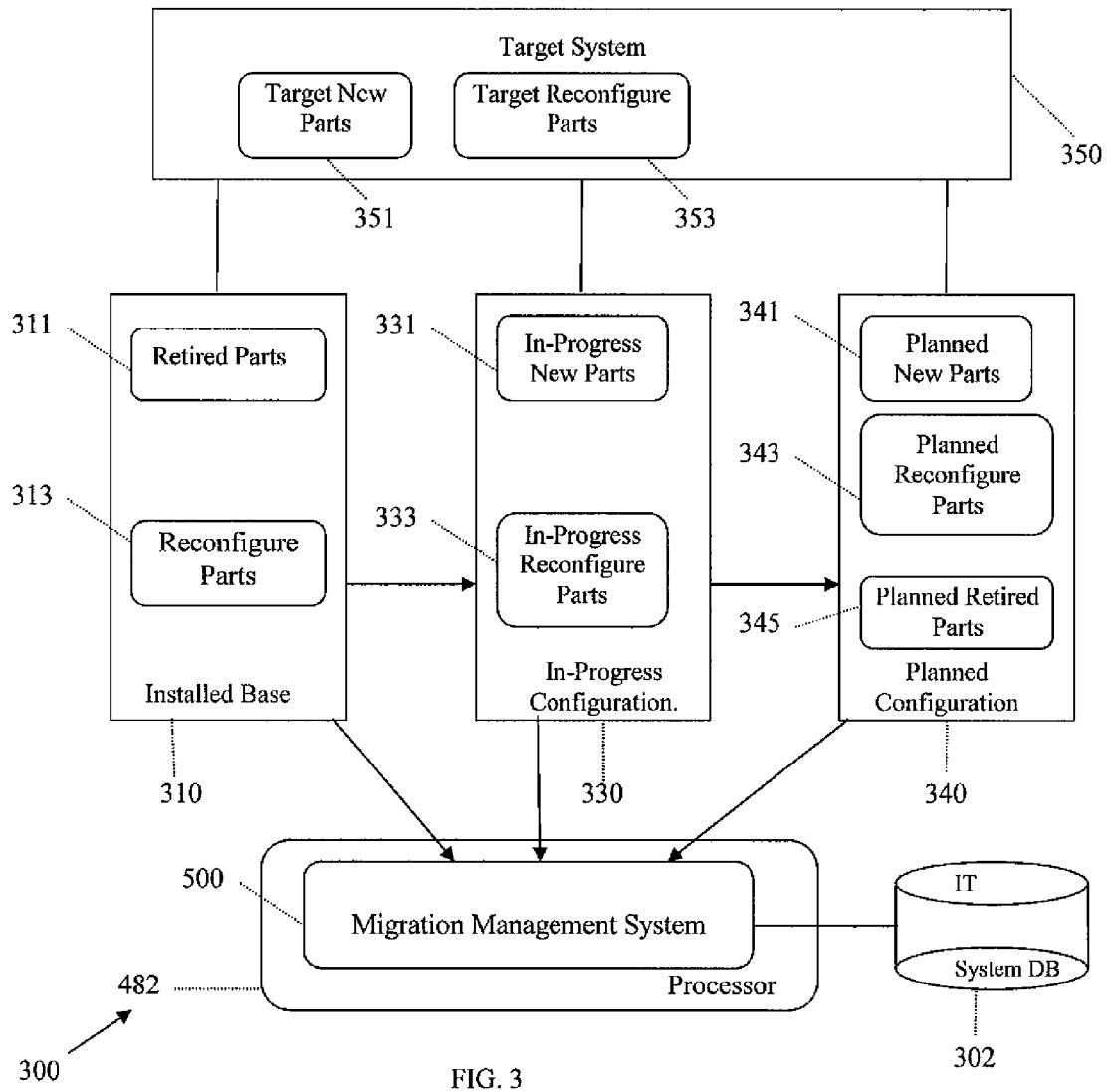
FIG. 3 illustrates an embodiment of an IT system migration scenario.

FIG. 3 illustrates an alternative embodiment of the present disclosure, an IT system migration scenario 300. The IT system migration scenario 300 includes an installed base 310, an in-progress configuration 330, a planned configuration 340, a target system 350, a migration management system 500, and an IT system database (DB) 302. Each of the installed base 310, the in-progress configuration 330, the planned configuration 340, and the target system 350 may include a number of parts. A part involved in the migration may be a software module, a hardware module, or a combination of the two. The part may perform an independent function and may be indexed and referenced with a unique identification (ID).

The installed base 310 may include a number of retired parts 311 and a number of reconfigure parts 313. The retired parts 311 may need to be decommissioned as part of migration efforts. The reconfigure parts 313 are the existing parts to be reused in the target system 350 after some reconfigurations, modifications, integration, testing or combination of the above. In some migration cases, the installed base 310 may continue performing its functions until the target system 350 is ready to take over, with as little service interruption in between as possible. To this end, the efforts to retire the retired parts 311 may need to be coordinated with the efforts to integrate the new parts and reconfigure parts into the target system 350. The installed base 310 may be used to keep track of the progress in decommissioning the retired parts 311. Each retired part may have a progress status to indicate the amount of progress that has been achieved so far in decommissioning the part. Aggregating the progress status data of the retired parts 311 may produce a summary progress score for the whole installed base 310.

The in-progress configuration 330 may represent a current state of the new system that is under construction. The in-progress configuration 330 may include a number of in-progress new parts 331 and a number of in-progress reconfigure parts 333. The in-progress reconfigure parts 333 are a subset of the reconfigure parts 313 of the installed base 310, which are currently under modification or reconfiguration. The in-progress new parts 331 are the newly acquired parts for the target system 350 and may need one or more of integration, testing and modification before they can be operational in the target system 350. Each of the in-progress new parts 331 and the in-progress reconfigure parts 333 may have a progress status to indicate the amount of progress that has been achieved so far in migrating the part into the target system 350. Aggregating the progress status data of the in-progress new parts 331 and the in-progress reconfigure parts 333 may produce an in-progress configuration wide summary progress score.

The planned configuration 340 may represent an intermediate target state of the IT system in migration, for which the migration related tasks have been planned but not completed yet for a current phase or period of time. The planned configuration 340 may include a number of planned new parts 341, a number of planned reconfigure parts 343, and a number of planned retired parts 345. The planned new parts 341 may be a subset of the target new parts 351, the new parts that have been planned for integration into the target system 350 for the current phase. The planned reconfigure parts 343 may be a subset of the reconfigure parts 313 of the installed base 310, the reconfigure parts that have been planned for integration into the target system 350 for the current phase. The planned retired parts 345 may be a subset of the retired parts 311 of the installed base 310, the retired parts that have been planned to be decommissioned for the current phase. A planned progress status for a specific date may be specified for each of the planned reconfigure parts 343, the planned new parts 341, and the planned retired parts 345, as part of the efforts in specifying the planned configuration 340. There may be multiple planned configurations during the entire process of migrating from the installed base to the target system, each of which may be for a specified target date, representing a step closer to the target system 350. Aggregating the progress status data of the planned new parts 341, the planned reconfigure parts 343, and the planned retired parts 345 may produce summary progress scores for the entire planned configuration 340.

The target system 350 may represent the eventual state of the new IT system when the migration process is completed and may include the parts suitable for the target IT system to function as designed. The target system 350 may include a number of target new parts 351 and a number of target reconfigure parts 353 from the installed base 310. In the target system 350, integration, reconfiguration, and modification of the target new parts 351 and the target reconfigure parts 353 should have been completed to a point that the new system may function as designed.

The IT system database 302 may store and help keep track of all parts involved in the IT system migration, including parts in the installed base 310, the in-progress configuration 330, the planned configuration 340, and the target system 350. Entries or records in the IT system database 302 may have a part ID field, a part description field, a constraint field to indicate one or more conditions that may apply to the part in migration, and a current migration progress status field, among others. The IT system database 302 may be implemented using an object-oriented database, a relational database or other current or future database technologies. The IT system database 302 may be a single database or multiple, distributed databases, depending on the design choice.

Figure 5:
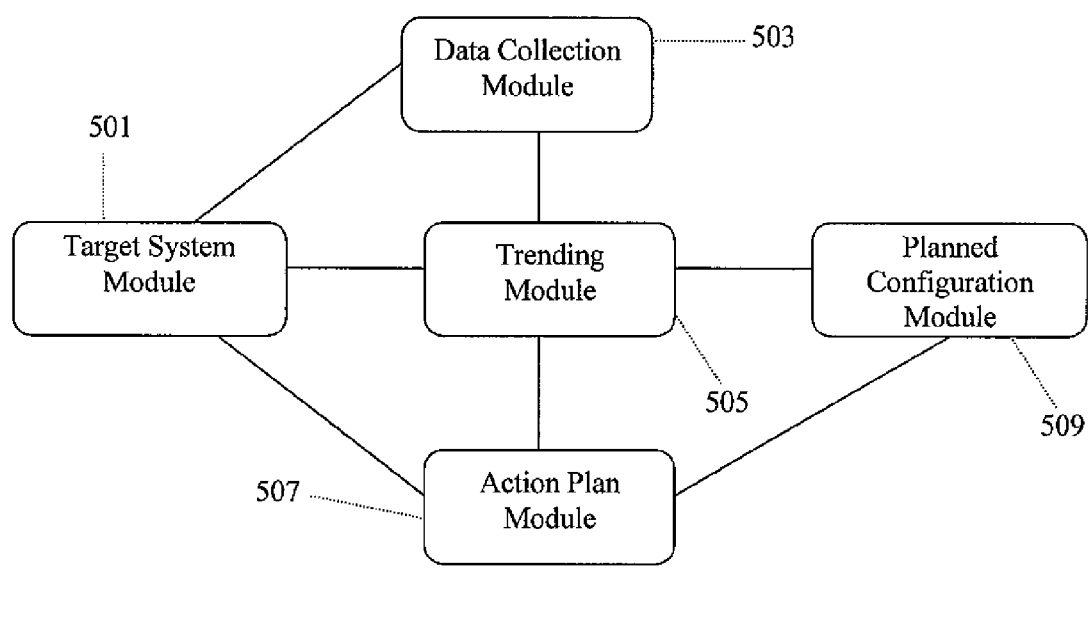
FIG. 5 illustrates an embodiment of an IT system migration management system.

The migration management system 500, implemented on the processor 482, may be configured to help manage the system migration process. The migration management system 500 may collect progress status data on the installed base 310, the in-progress configuration 330, the planned configuration 340, and the target system 350. The migration management system 500 may also generate a roll-up or aggregate progress score for the configurations, and compare the progress score of the installed base 310 and the in-progress configuration 330 with that of the planned configuration 340 or the target system 350 to provide an indication on how well the system migration has progressed so far. The migration management system 500 is illustrated in FIG. 5 and described in more detail later. The migration management system 500 may be implemented on a processor 482 included in a general purpose computer.

FIG. 4 shows a chart 400 including exemplary progress scores to help illustrate the migration scenario 300. In the migration scenario, the IT system migrates from the installed base 310 to the new, target system 350. Some parts of the installed base 310 are to be retired and some are to be reconfigured or modified to be part of the target system 350. Some new parts are to be added into the target system 350. The exemplary migration scenario illustrated in FIG. 4 may involve 300 user access terminals, 4 mainframe/midrange server computers, 15 storage devices, 4 data center/data bases, and 25 $3^{rd}$ party software applications. Of the 100 user access terminals, 25 are to be reconfigured, 40 are to be retired, and 35 new ones are to be added. Of the 4 mainframe/midrange server computers, 1 is to be reconfigured, 2 are to be retired, and 1 new one is to be added. Of the 15 storage devices, 5 are to be reconfigured, 5 are to be retired, and 5 new ones are to be added. Of the 4 databases, 1 is to be reconfigured, 1 is to be retired, and 2 new ones are to be added. Of the 25 $3^{rd}$ party software applications, 5 are to be reconfigured, 10 are to be retired, and 10 new ones are to be added.

FIG. 4 shows the progress status data and the aggregate progress scores for installed base 310, the in-progress configuration 330, the planned configuration 340, and the target system 350. The progress status data on decommissioning the retired parts of the installed base 310 may include 60% completion for the user access terminals, 50% completion for the midrange/mainframe server computers, 35% completion for the storage devices, 50% completion for the databases, and 65% completion for the $3^{rd}$ party software applications. The installed base 310 may have an aggregated, un-weighted progress score of 52% completion.

The in-progress configuration 330 has two sets of parts, reconfigure parts and new parts. The progress status data for the new parts of the in-progress configuration 330 may include 75% completion for the user access terminals, 75% completion for midrange/mainframe server computers, 65% completion for the storage devices, 50% completion for the databases, and 70% completion for the $3^{rd}$ party software applications. The new parts of the in-progress configuration 330 may have an aggregated, un-weighted progress score of 67%. The progress status data of the reconfigure parts of the in-progress configuration 330 may include 35% completion for the user access terminals, 55% completion for midrange/mainframe computers, 45% completion for the storage devices, 70% completion for the databases, and 80% completion for the $3^{rd}$ party software applications. The reconfigure parts of the in-progress configuration 330 may have an aggregated, un-weighted progress score of 57% completion.

The planned configuration 340 has three sets of parts, retired parts, reconfigure parts and new parts. The planned progress status of the new parts of the planned configuration 340 may include 75% completion for the user access terminals, 80% completion for the midrange/mainframe server computers, 65% completion for the storage devices, 65% completion for the databases, and 70% completion for the $3^{rd}$ party software applications. The new parts of the planned configuration 340 may have an aggregated, un-weighted progress score of 71%. The planned progress status data of the reconfigure parts of the in-progress configuration 340 may include 70% completion for the user access terminals, 75% completion for the midrange/mainframe server computers, 50% completion for the storage devices, 70% completion for the databases, and 85% completion for the $3^{rd}$ party software applications. The reconfigure parts of the planned configuration 340 may have a planned aggregated, un-weighted progress score of 67% completion. The planned progress status data of the retired parts of the planned configuration 340 may include 70% completion for the user access terminals, 60% completion for the midrange/mainframe computers, 50% completion for the storage devices, 50% completion for the databases, and 70% completion for the $3^{rd}$ party software applications. The retire parts of the planned configuration 340 may have an aggregated, un-weighted progress score of 60%.

The target system 350 may have progress status data of 100% completion for the reconfigure parts and the new parts in normal cases. In some cases, either the new parts or the reconfigure parts of the target system 350 may not have a final progress status data of 100% completion. This may be because the migration process may be viewed as complete, and the target system 350 may not wait for the some nonessential parts to be 100% completed before the target system 350 starts performing the normal functions as designed. For example, a 95% completion is specified for reconfigure user access terminals. The remaining parts may be integrated at a later time.

FIG. 5 illustrates an embodiment of the migration management system 500. The management system 500 may include a target system module 501, a data collection module 503, a trending module 505, an action plan module 507, and a planned configuration module 509. The migration management system 500 may be implemented on a general purpose computer.

The target system module 501 may allow a user to identify a final state for a target IT system. The target system module 501 may have a UI to allow a user to input a target date and parts that would form the target system for the target date. The target system module 501 may allow the user to identify a number of new parts, and a number of reconfigure parts. The user may also specify a target date and progress status for each part of the target system 350. For example, for the user access terminals as shown in FIG. 4, the new parts may have a progress status of 100% completion, and the reconfigure parts may have a progress status of 100% completion by the specified target date. As mentioned earlier, in some cases, not all parts need to be 100% completed before the new IT system starts its normal operations.

The planned configuration module 509 may allow a user to identify one or more planned configurations of the new IT system. A planned configuration may represent an intermediate state of the target system 350. The planned configuration module 509 may have a UI to allow a user to input a planned date and parts that would form the planned configuration for the planned date. The user may identify a number of reconfigure parts and the respective planned progress status, a number of new parts and the respective planned progress status, and a number of retired parts and the respective planned progress status. The planned configuration module 509 may also allow the user to specify a connection or an interface between the parts. For example, the user may specify a Wi-Fi interface or an Ethernet interface between an access terminal and a mainframe server computer.

The data collection module 503 may allow the progress status data to be collected, sorted, organized, and stored in the IT system database 302. The data collection module 503 may allow for a number of modes of data collection. One example mode is to read in the progress status data from a spread sheet. One mode may be directly importing progress status data from another application. Another mode of data collection is manual entry of the progress status data by the user via a UI. The data collection module 503 may allow collection of the progress status data on a configuration such as the installed base 310, or on parts of the configuration. The data collection module 503 may also reconcile different status data measurements. For example, one status data scale is a 0-to-5 scale of progress status data and another is a 0%-to-100% scale. The data collection module may convert the 0-to-5 scale to the 0%-to-100% scale.

The trending module 505 may aggregate progress status data to obtain a summary or aggregate progress score, and apply a weight to the summary progress score as needed. The trending module 505 may aggregate progress status data at different levels, such as at a part level, at a configuration level, and at a system level. For example, the trending module 505 may aggregate progress status data of the new parts 331 and the reconfigure parts 333 of the in-progress configuration 330 to arrive at a configuration-wide progress score. Similarly the trending module 505 may aggregate progress scores of the installed base 310 and the in-progress configuration 330 to arrive at a system-wide progress score. The trending module 505 may be configured with different aggregation algorithms to accommodate different needs. For example, one simple aggregation algorithm is to add up the progress status data of one or more parts of a configuration and then arriving at a configuration-wide progress score by averaging the total progress score over the number of the parts. Another algorithm may apply an assigned weight to a progress status of a part, based on the level of the importance the user assigns to the part or based on an estimated level of efforts suitable to putting the part into the operational state in the target system 350. A midrange/mainframe server computer, for example, may have a higher weight than a user access terminal.

The trending module 505 may be configured with an UI to allow the user to assign a weight to a part or a configuration, and to modify and delete the weight. The trending module 505 may produce a progress slope or a trending metrics by plotting the progress scores of the installed base 310, the in-progress configuration 330, the planned configuration 340, and the target system 350, respectively. The trending metrics or slope might indicate whether the migration is progressing toward the target system 350 as planned or is falling behind. For example, the progress score of the install base 310 may be 50% complete, the progress score of the in-progress configuration 330 may be only 10% complete, while the planned configuration 340 may call for a progress score of 50% completion by a specific date. Based on the rate of the progress so far, the trending module 505 may alert the user that the target system 350 may not be achieved by the target date. The trending module 505 may compare the progress score of the installed base 310 and the progress score of the in-progress configuration 330 with that of the planned configuration 340 and may produce a projected trending metric toward the target system 150 using the current progress rate.

The action plan module 507 may suggest an action plan, based on the progress scores and the trending metrics produced by the trending module 505. The action plan module 507 may suggest a corrective action plan, based on factors such as low progress status of a part and the weight assigned to the part, among others. The corrective action may include reallocating resources to the parts that fall behind the schedule, changing the order in which the parts are to be worked on based on the dependency between the parts, increasing resources if applicable, and revising the planned configuration 340, among others.

Figure 6:
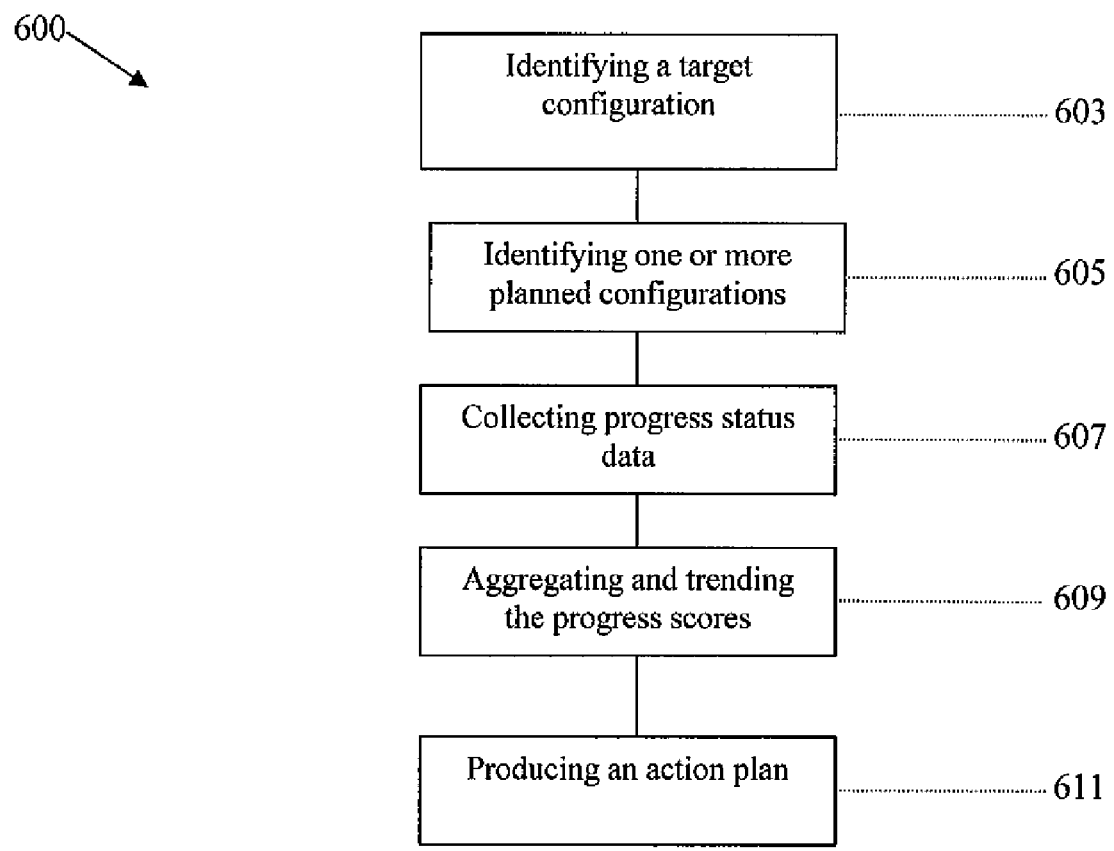
FIG. 6 illustrates an exemplary method of managing migration of an IT system.

FIG. 6 illustrates an embodiment of a process 600 for migrating from the installed base 310 to the target system 350. The process 600 may include identifying a target system at block 603, identifying one or more planned configurations at block 605, collecting progress status data at block 607, aggregating and trending progress scores at block 609, and producing an action plan at block 611.

Block 603 shows the step of identifying a target system. A target system may represent the eventual state of a new IT system that is ready for operation and to take over from an installed base such as the installed base 310 in FIG. 3. This step may include sub-steps such as specifying a target date, identifying parts, specifying target migration status for each part, identifying interfaces between the parts, and storing the specified target system in a database. Specifying a target date may involve determining a date by which the target system may be achieved. Identifying the parts may involve identifying a number of new parts, and a number of reconfigure parts that together form the eventual configuration of the new IT system for the specified target date. Identifying the progress status involves determining a migration progress status for the identified parts by the target date. For most of the identified parts, the migration status would be 100% complete, in order for the target system to function as designed. It may not be required that all the parts be 100% completed before the target system starts its operation. Storing the specified configuration in a database may involve saving the specified target date, the identified parts, the target progress status for each identified part, and the identified interfaces between the parts, into a database such as the IT system database 302.

Block 605 shows the step of identifying one or more planned configurations. A planned configuration may represent an intermediate target system in progress toward the target system 350. Multiple planned configurations may be identified during the process of the IT system migration, each a step closer to the target system 350. This step may include sub-steps such as specifying a planned date, identifying parts, specifying migration status of each identified part, identifying interfaces between the parts that form the planned configuration, identifying an order in which the parts are worked on, and storing the specified planned configuration in a database. Specifying a planned date may involve determining a date by which the planned configuration may be achieved. Identifying parts may involve identifying a number of new parts, a number of reconfigure parts, and a number of retired parts. Identifying the migration status may involve determining a migration progress status for an identified part for the planned date. Identifying the interfaces between the parts may involve specifying a connection or an interface between parts. For example, the user may specify a particular version of Wi-Fi interface between a user access terminal such as a desktop PC and a server computer. Identifying the order in which the identified parts are migrated may involve identifying the dependencies between the parts and determining a sequence for the parts to be worked on. For example, a database may depend on a specific server computer to be operational before the database can be installed or reconfigured. Storing the planned configuration in a database may involve saving the specified planned date, the identified parts, the migration status for each identified part, the identified interfaces between the parts, and the identified order and dependencies into a database such as the IT system database 302. The above process of identifying one planned configuration may be repeated to identify multiple planned configurations, one at a time and for one planned date.

The block 607 shows the step of collecting migration progress status data. This step may include sub-steps such as collecting migration progress status data of subparts, collecting progress status data of the parts, and reconciling the status measurement scales if there is a need. Collecting migration status data of subparts may involve collecting migration status of each component subpart. For example, a server computer, a new part to be put in the target IT system 350, may have subparts that that may need some integration or configuration efforts, subparts such as attached input/output (I/O) devices and auxiliary storage devices, among others. Collecting migration progress status of a part may involve collecting a migration progress status of the part such as the server computer, either directly from a user input or by calculating a progress status from the migration progress status data of the subparts. Reconciling measurement scales of progress status may involve converting one measure scale to another. For example, a migration status scale of 0 to 5, with 0 indicating that the migration has not started, and 5 indicating that the migration is complete, may be converted to a percentage scale of 0%, 20%, 50%, 60%, 80%, and 100%. In another embodiment, however, a different migration status scale may be used and may be mapped to a different percentage scale. This data collection process may be repeated for the installed base 310, the in-progress configuration 330, the planned configuration 340, and the target system 350.

The block 609 shows the step of aggregating and trending the collected migration progress status data. This step may include aggregating the progress status data into a summary progress score and recursively proceeding to a system-wide summary progress score or to a level suitable for the need of a user. Aggregate progress scores may be obtained at different levels such as at a configuration level and at a system level. Aggregating component progress status data may involve adding up the progress status data of different parts of a configuration, such as the new parts 331, and the reconfigure parts 333 of the in-progress configuration 330, to arrive at a configuration-wide progress score. Similarly, the progress scores of the installed base 310 and the in-progress configuration 330 may be aggregated to arrive at a system-wide progress score. The step of producing an aggregate progress score may also involve selecting an appropriate aggregation method. Different aggregation algorithms may be used for different needs. For example, one simple aggregation algorithm is to add up progress status data of multiple parts to arrive at a configuration-wide progress score by averaging total progress score over the number of the parts. Another algorithm may be to apply an assigned weight to a progress status of a part, based on the level of the importance the user assigns to the part and the estimated level of efforts suitable for putting the part in service in the target system 350. For example, a server computer in the migration example of FIG. 4 may have a higher weight than a user access terminal such as a desktop computer. A weight may be assigned to a part or a configuration, and the weight may be stored, modified, and deleted in the IT system database 302. Multiple progress scores for different dates may be produced to show a progress trend for a specified period of time.

The block 611 shows the step of producing one or more action plans. This step may include identifying potential areas for action, and suggesting one or more action plans. Identifying potential areas for actions may involve identifying the parts and configuration that fall behind schedule in migration by comparing the progress score of the installed base 310, the progress score of the in-progress configuration 330 with that of the planned configuration 340 and the target system 350. For example, comparing the installed base 310 and the in-progress configuration 330 with the planned configuration 340 may indicate a gap between the actual progress and a planned progress for a planned date. Comparing the aggregate progress score of the installed base 310 and the in-progress configuration 330 with that of the target system 350 may indicate whether the migration process trends toward the target system 350 according to the current rate of progress. Suggesting one or more action plans may involve identifying a corrective action plan based on factors such as a low progress status of a part, and the weight assigned to the part, among others. Suggesting one or more action plans may also involve determining the available options. For example, the available options may include reallocating resources to the parts or a configuration that falls behind schedule, reordering the parts to be integrated according to some new dependencies uncovered during the migration progress, and increasing migration resource allocation, among others.

The system described above may be implemented on any general-purpose computer with sufficient processing power, memory resources, and network throughput capability to handle the necessary workload placed upon it. FIG. 7 illustrates a typical, general-purpose computer system suitable for implementing one or more embodiments disclosed herein. The computer system 480 includes a processor 482 (which may be referred to as a central processor unit or CPU) that is in communication with memory devices including secondary storage 484, read only memory (ROM) 486, random access memory (RAM) 488, input/output (I/O) devices 490, and network connectivity devices 492. The processor may be implemented as one or more CPU chips.

The secondary storage 484 is typically comprised of one or more disk drives or tape drives and is used for non-volatile storage of data and as an over-flow data storage device if RAM 488 is not large enough to hold all working data. Secondary storage 484 may be used to store programs which are loaded into RAM 488 when such programs are selected for execution. The ROM 486 is used to store instructions and perhaps data which are read during program execution. ROM 486 is a non-volatile memory device which typically has a small memory capacity relative to the larger memory capacity of secondary storage. The RAM 488 is used to store volatile data and perhaps to store instructions. Access to both ROM 486 and RAM 488 is typically faster than to secondary storage 484.

I/O devices 490 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 492 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 492 may enable the processor 482 to communicate with an Internet or one or more intranets. With such a network connection, it is contemplated that the processor 482 might receive information from the network, or might output information to the network in the course of performing the above-described method steps. Such information, which is often represented as a sequence of instructions to be executed using processor 482, may be received from and outputted to the network, for example, in the form of a computer data signal embodied in a carrier wave Such information, which may include data or instructions to be executed using processor 482 for example, may be received from and outputted to the network, for example, in the form of a computer data baseband signal or signal embodied in a carrier wave. The baseband signal or signal embodied in the carrier wave generated by the network connectivity devices 492 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embodied in the carrier wave, or other types of signals currently used or hereafter developed, referred to herein as the transmission medium, may be generated according to several methods well known to one skilled in the art.

The processor 482 executes instructions, codes, computer programs, scripts which it accesses from hard disk, floppy disk, optical disk (these various disk based systems may all be considered secondary storage 484), ROM 486, RAM 488, or the network connectivity devices 492. While only one processor 482 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A system, comprising:
a first database identifying a plurality of current configurations of an information technology (IT) system;
a second database identifying a plurality of standard configurations of the IT system;
a processor in communication with the first database and the second database; and
an analysis engine, when executed by the processor, that is configured to determine a progress status for each current part in a first set of current parts of a first current configuration of the IT system based on comparing a first standard configuration of the IT system to the first current configuration of the IT system, wherein the progress status for each current part in the first set of current parts measures an amount of progress of migration to the first standard configuration of the IT system, and wherein comparing the first standard configuration of the IT system to the first current configuration of the IT system comprises at least one of:
comparing a first standard server brand designated in the first standard configuration to the server brand associated with each of a plurality of servers of the first current configuration,
comparing a first standard server model designated in the first standard configuration to the server model associated with each of the servers of the first current configuration,
comparing a first standard operating system (OS) designated in the first standard configuration to the operating system associated with each of the servers of the first current configuration, comparing a first standard database designated in the first standard with each of a plurality of databases of the first current configuration, and comparing a plurality of standard applications with each of a plurality of applications of the first current configuration, wherein the analysis engine if further configured to:

determine a summary progress score of the first current configuration of the IT system by aggregating the progress status of each part of the first set of current parts of the first current configuration of the IT system, wherein the first current configuration of the IT system is selected from a group of configurations consisting of a baseline configuration of the IT system and an in-progress configuration of the IT system, when the first configuration of the IT system is the baseline configuration of the IT system, the first set of current parts are retired parts that are to be decommissioned as part of the migration to the first standard configuration of the IT system, the progress status for each retired part measures an amount of progress that has been achieved so far in decommissioning the part, and the summary progress score is an installed base summary progress score, and when the first configuration of the IT system is the in-progress configuration of the IT system, the first set of current parts are in-progress new parts and in-progress reconfigure parts, the progress status for the in-progress reconfigure parts and the in-progress new parts indicate the amount of progress that has been achieved so far in migrating to the standard configuration of the IT system, and the summary progress score is an in-progress summary score, wherein the in-progress new parts are new parts for the first standard configuration of the IT system, and wherein the in-progress reconfigure parts are existing parts that are to be reused in the first standard configuration of the IT system.

2. The system of claim 1, the first database and the second database comprise data entries for the plurality of server brands, the plurality of server models, the plurality of operating systems, the plurality of databases, and the plurality of applications.

3. The system of claim 1, wherein the analysis engine is further configured to assign weights to the progress statuses of the first set of current parts using criteria based on importance and priority associated with the progress statuses.

4. The system of claim 3, wherein the analysis engine is further configured to aggregate the weighted progress statuses into a weighted summary progress score.

5. The system of claim 1, wherein the analysis engine is further configured to trend progress statuses from a plurality of current configurations of the IT system.

6. The system of claim 5, wherein the plurality of current configurations of the IT system are for different points of time.

7. The system of claim 1, wherein the first standard configuration of the IT system is a target configuration of the IT system.

8. The system of claim 1, wherein the first standard configuration of the IT system is a planned configuration of the IT system that is an intermediate target state of the IT system as of a specified date.

9. The system of claim 1, wherein the plurality of standard configurations of the IT system include a plurality of planned configurations of the IT system.

10. The system of claim 1, wherein the processor is further configured to implement:

a target system module configured to identify a target system, a planned configuration module configured to identify a planned configuration;

a data collection module configured to collect a first progress status data for an installed base, a second progress status data for an in-progress configuration, a third progress status data for the planned configuration, and a fourth progress status data for the target system, a trending module configured to produce a current progress score by aggregating the first progress status data, and the second progress status data, to produce a planned progress score by aggregating the third progress status data, and to produce a target progress score by aggregating the fourth progress status data, and an action plan module configured to produce an action plan based on the current progress score, the planned progress score, and the target progress score;

an IT system database configured to store data on the installed base, data on the in-progress configuration, data on the planned configurations, data on the target system, the first progress status data, the second progress status data, the third progress status data, and the fourth progress status data.

11. The system of claim 10, wherein the first progress status data is based on progress status data of a plurality of retired parts, and a plurality of reconfigure parts.

12. The system of claim 10, wherein the second progress status data is based on progress status data of a plurality of in-progress new parts, and a plurality of in-progress reconfigure parts.

13. The system of claim 10, wherein the third progress status data is based on progress status data of a plurality of planned reconfigure parts, a plurality of planned new parts, and a plurality of planned retired parts.

14. The system of claim 10, wherein the fourth progress status data is based on progress status data of a plurality of target reconfigure parts, and a plurality of target new parts.

15. The system of claim 10, wherein the trending module is configured to apply a first weight to the first progress status data, and a second weight to the second progress status data in generating the current progress score, and a third weight to the third progress status data in generating the planned progress score, and a fourth weight to the fourth progress status data in generating the target progress score.

16. The system of claim 10, wherein the action module is configured to compare the current progress score with the planned progress score and with the target progress score.

* * * * *